United States Patent [19]

Axelrod et al.

[11] Patent Number: 4,624,979

[45] Date of Patent: Nov. 25, 1986

[54] FLAME RETARDANT POLYPHENYLENE ETHER-POLYSTYRENE BLENDS OF INCREASED HEAT RESISTANCE AND METHOD OF ACHIEVEMENT

[75] Inventors: Robert J. Axelrod, Glenmont, N.Y.; Glenn D. Cooper, late of Delmar, N.Y., by Rose H. Cooper, executrix

[73] Assignee: General Electric Company, Pittsfield, Mass.

[21] Appl. No.: 675,715

[22] Filed: Nov. 28, 1984

[51] Int. Cl.$^4$ .............................................. C08K 5/52
[52] U.S. Cl. .................................... 524/140; 524/141; 524/497; 524/503; 524/508; 524/540; 524/847; 525/92; 525/151
[58] Field of Search ................ 523/332; 524/140, 141, 524/497, 503, 508, 540, 897; 525/92, 151

[56] References Cited

U.S. PATENT DOCUMENTS

| 3,809,729 | 5/1974 | Reinhard | 525/151 |
| 3,816,562 | 6/1974 | Holoch | 525/151 |
| 4,077,934 | 3/1978 | Lee, Jr. | 525/151 |

FOREIGN PATENT DOCUMENTS

| 144860 | 7/1948 | Australia | 523/332 |
| 2076831 | 12/1981 | United Kingdom | 525/151 |

*Primary Examiner*—John Kight
*Assistant Examiner*—Kriellion Morgan
*Attorney, Agent, or Firm*—Hedman, Gibson, Costigan & Hoare

[57] ABSTRACT

A method for increasing the heat distortion temperature of certain blends of polyphenylene ether resin and styrene polymers is described in which an admixture is formed of a polyphenylene ether resin and a flame retardant copolymer of styrene and up to 50 percent dibromostyrene. The resulting compositions can be formulated to include one or more additional ingredients and are moldable into articles characterized by good flame retardancy and light stability, as well as a higher heat distortion temperature compared with articles formed from corresponding blends using homopolystyrene or styrene-bromostyrene copolymer.

25 Claims, No Drawings

FLAME RETARDANT POLYPHENYLENE ETHER-POLYSTYRENE BLENDS OF INCREASED HEAT RESISTANCE AND METHOD OF ACHIEVEMENT

BACKGROUND OF THE INVENTION

In recent years, the polyphenylene ether resins (also sometimes referred to as polyphenylene oxide resins) have gained wider recognition as engineering thermoplastics which can be shaped into articles having good mechanical and electrical properties, and their use has been extended to form types of products ranging from household appliances to automotive parts and trim, and so forth. The polyphenylene ether resins and methods of their preparation have been thoroughly described in the patent literature, including U.S. Pat. Nos. 3,306,874 and 3,306,875 (to Allan S. Hay), and U.S. Pat. Nos. 3,257,357 and 3,257,358 (to Gelu S. Stamatoff), and elsewhere.

As is well established, the polyphenylene ether resins are utilizable in admixture with styrene polymers over a broad spectrum of proportions, and the resulting blends can be molded into many of the same articles as above, but with the advantage that the moldings often possess better physical or chemical properties. Compositions of polyphenylene ether resins and styrene polymers are also described in the patent literature, including U.S. Pat. No. 3,383,435 (to Eric P. Cizek), and other patents known to those skilled in the art.

Compositions of polyphenylene ether resin and styrene polymers are normally flame retardant, and there are instances when it is desirable to impart a degree of flame retardancy to the compositions such that the molded articles are better able to resist burning or melting when exposed to elevated temperatures or placed near an open flame. To this end, it has been disclosed in the art that certain halogenated compounds, and brominated compounds in particular, are effective as flame retardant additives for polyphenylene ether-polystyrene blends. An example of such a disclosure is U.S. Pat. No. 3,809,729 (Reinhard). A drawback of brominated flame retardant additives, however, is their poor stability upon exposure to ultraviolet light radiation. This can be a serious problem if the flame retardant blends are to be manufactured into articles which during normal use are exposed to sunlight. After a time, discoloration and loss of flame retardancy can result.

It has been disclosed that blends made up of polyphenylene ether resin and copolymers of styrene and monobromostyrene have better flame resistance and UV-stability than corresponding blends of polyphenylene ether and polystyrene containing the same amount of bromine in the form of low molecular weight brominated additives. Good mechanical properties, especially Izod and Gardner impact strengths, are obtained with those copolymers which are compatible with the polyphenylene ether resin, that is, copolymers having up to about 70 percent by weight of bromostyrene content. Blends of this type are described by Glenn Cooper and Arthur Katchman in copending application Ser. No. 155,150, filed May 30, 1980. Other blends of a similar type containing a rubber modifier are described by the same authors in copending application Ser. No. 155,149, same filing date. Both of these applications are assigned to the same assignee as herein.

INTRODUCTION TO THE INVENTION

The discovery has now been made that copolymers of styrene and dibromostyrene containing up to, but no more than, 50 percent by weight of dibromostyrene units are compatible with polyphenylene ether resin. This is surprising because the dibromostyrene homopolymer is incompatible with polyphenylene ether resin, and styrene copolymers containing more than about 10 percent by weight of dibromostyrene units are incompatible with polystyrene homopolymer. The newly discovered blends have good flame retardant properties, which can be enhanced by the incorporation into the blends of minor amounts of conventional flame retardant additives, for example, aromatic phosphorus compounds. Moreover, the present kinds of blends are characterized by higher heat distortion temperatures, after molding, than corresponding blends of polyphenylene ether resin with either polystyrene homopolymer or copolymers of styrene and monobromostyrene.

This invention thus comprises several facets: a method for increasing the heat distortion temperature of polyphenylene ether-polystyrene blends by use of the above mentioned styrene-dibromostyrene copolymer as the styrenic polymer; flame retardant compositions comprising compatible admixtures of polyphenylene ether resin and the described styrene-dibromostyrene copolymer; and articles molded from such compositions.

The heat distortion temperature, or the "deflection temperature" as it is also termed, is an important thermal property. In essence, this is a measure of the tendency of a molded part to undergo softening when heated under stress. Desirably, for most applications the composition should possess a relatively high heat distortion temperature, or stated another way, it should have a high resistance to undergoing deformation under the combined influence of temperature and stress. As will be seen from the accompanying examples, the present blend compositions are very satisfactory in this regard.

DETAILED DESCRIPTION OF THE INVENTION

In the broader aspects, the compositions of the invention are compatible admixtures of (a) a polyphenylene ether resin, and (b) a flame retardant copolymer of styrene and dibromostyrene, optionally also including one or more other flame retardant agents.

The respective amounts of components (a) and (b) can vary widely within the blend, for example, between 99:1 and 1:99, as is usual for polyphenylene ether and styrene polymers.

In the practice of the invention certain ingredients are preferred for use. The polyphenylene ether resin, component (a), is preferably a homopolymer or copolymer of the formula,

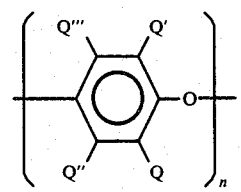

wherein Q, Q', Q" and Q'" are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in the above mentioned patents of Hay and Stamatoff, from the reaction of phenols including but not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-cyclohexylphenol; 2-methyl-6-tolylphenol; 2-methyl-6-methoxyphenol; 2-methyl-6-butylphenol; 2,3,6-trimethylphenol; and 2,3,5,6-tetramethylphenol.

Each of these may be reacted alone to produce the corresponding homopolymer, or with another phenol to produce the corresponding copolymer. Special mention is made of 2,6-dimethylphenol and its corresponding polymer, poly(2,6-dimethyl-1,4-phenylene)ether; and of 2,6-dimethylphenol used in conjunction with other phenols, such as 2,3,6-trimethylphenol, 2-methyl-6-butylphenol, etc., and their corresponding copolymers, such as poly(2,6-dimethyl- co-2,3,6-trimethyl-1,4-phenylene) ether, poly(2,6-dimethyl- co-2-methyl-6-butyl-1,4-phenylene)ether, etc.

For purposes of the present invention, an especially preferred family of polyphenylene ethers include those having alkyl substitution in the two positions ortho to the oxygen ether atom, i.e., those of the above formula wherein Q and Q' are alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene) ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether.

The styrene-dibromostyrene copolymer, component (b), is prepared by copolymerization from a mixture of the corresponding monomers. In a representative procedure, a mixture of styrene and dibromostyrene is heated in an enclosed container, under an inert atmosphere, for example, nitrogen, at a temperature in the range between 80° and 180° C. for a period of from 1 hour to 5 days to produce the copolymer. The copolymerization reaction is preferably carried out at elevated pressures of between 14 and 300 psi.

To facilitate the reaction, a polymerization catalyst can be included, which may be selected from among those materials conventional for styrene polymerization, for example, azo-bis(isobutyronitrile) or dicumyl peroxide.

After the copolymerization reaction is completed, the copolymer is recovered, purified and dried in the normal manner. Purification can be achieved by one or more washings; by dissolving, then precipitating from a solvent; or by a combination of such techniques.

The dibromostyrene portion of the copolymer can be represented by the following formula

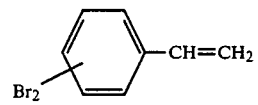

in which the bromine atoms, Br, can be positioned anywhere on the benzene ring. In the normal oase, a mixture of isomers will form, including 2,4- and 3,4-dibromo, with greater than 30 percent consisting of the 3,4-dibromo. The mixture is usable as such for component (b), or if desired it can be purified further to separate the isomers for individual use.

To enhance the flame retardancey, it can be beneficial to include other flame retardant agents in the compositions of the invention. These can be chosen from among the many materials conventional for the purpose of imparting flame retardant properties to polyphenylene ether-polystyrene blends. By way of illustration, such additives include aromatic phosphate compounds and/or aromatic halogen compounds as described in U.S. Pat. No. 3,639,506 (Haaf); antimony compounds such as described in U.S. Pat. No. 3,809,729 (Reinhard), for example, antimony oxide, and the like; compounds containing phosphorus-nitrogen bonds, such as phosphonitrilic chloride, phosphorus ester amides, phosphonic acid amides or phosphinic acid amides as described in U.S. Pat. No. 4,355,126 (Haaf and Reinhard); other phosphorus containing compounds such as organic phosphinic acids, phosphonates, phosphinates, thiophosphates, phosphonites, phosphinites, phosphine oxides, phosphines, phosphites, or elemental phosphorus, as described in U.S. Pat. No. 3,974,235 (Abolins and Cooper); and di- or polyfunctional non-polymeric and polymeric phosphates as described in British Pat. No. 2,043,083.

These additional flame retardant agents are generally useful in relatively small amounts of, e.g., from about 1 to about 10 parts by weight based on 100 parts of polymeric components (a) and (b) combined.

In preferred embodiments the compositions will contain a small amount of a flame retardant aromatic phosphate of the formula

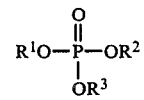

in which $R^1$ $R^2$ and $R^3$ may be the same or different and are selected from the group consisting of alkyl, cycloalkyl, aryl, alkyl substituted aryl, aryl substituted alkyl, halogen, halogen substituted aryl, or a combination of any of the foregoing.

Examples include cresyl diphenyl phosphate, 2-ethylhexyl diphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-nhexyl phosphate, di-n-octyl phenyl phosphate, di-2-ethylhexyl phenyl and tri-2-ethylhexyl phosphate, tri(polychlorophenyl) phosphate or mixtures of any of the foregoing.

Preferably, at least one R is aryl. Especially preferred is triphenyl phosphate, as such or in one of its modified forms, such as isopropylated triphenyl phosphate.

In addition to the ingredients described, the compositions of the invention can also contain one or more further components, which may be selected from among materials commonly employed with polyphenylene ether resins. These can be, for instance, mineral fillers such as talc, clay, titanium dioxide or mica., reinforcing fillers such as wollastonite or glass; or additives which function to enhance the chemical or physical properties of the moldings, such as pigments, dyes, antioxidants, uv-stabilizers, mold release agents, plasticizers, and so forth. Amounts effective to achieve the desired benefits are utilized, and typically from about 1 to about 50 parts by weight, or more, of the total composition weight, depending on factors such as the particular additive, the desired degree of improvement, and the amount of polyphenylene ether resin, as those in the art will understand.

Mention is also made of polymeric additives for improving the impact resistance of the compositions after molding, and especially those polymers which are based on styrene. Examples include rubber modified high impact polystyrene (HIPS), and styrenic elastomers such as styrene-acrylonitrile copolyers, styrene-isobutylene copolymers, styrene-isoprene copolymers, styrene-butadiene copolymers, and acrylonitrile-styrene-butadiene terpolymers. Many are described in the patent literature in conjunction with polyphenylene ether resins, including U.S. Pat. No. 4,139,574 (Cooper and Katchman), U.S. Pat. Nos. 4,172,826 and 4,196,116 (Cooper and Haaf), U.S. Pat. No. 4,172,929 (Cooper, et al.), U.S. Pat. No. 3,636,508 (Kambour), and U.S. Pat. No. 4,167,507 (Haaf). In general, inclusion in the composition of amounts in the range between about 5 and about 30 parts by weight, based on 100 parts of (a) and (b) combined, will reduce brittleness and make the compositions tougher and more resistant to abuse in the molded article, as measured by standard test procedures such as those using pendulum-type machines with notched or unnotched test specimens (Izod or Izod-type), or falling weight methods (e.g., the Gardner test).

The ingredients of the composition may be added in any desired order to obtain the final blend. In one way, preparation is accomplished by first providing a homogeneous admixture of components (a) and (b), by mechanical mixing in a blender, melt blending in an extruder at elevated temperatures, or by dissolution of both in a common solvent and coprecipitation therefrom, with the latter procedure being preferred. After the mixture of (a) and (b) has been prepared, the other ingredients including any additional flame retardant agents may be added and are mixed thoroughly with the blend.

The blends of this invention can be extruded, compression or injection molded, calendered or thermally formed by other methods into articles of various shapes and sizes which possess a combination of good flame retardancy and good light stability. The compositions are commercially useful as such or in the form of the shaped article.

DESCRIPTION OF THE SPECIFIC EMBODIMENTS

The method, compositions and articles of this invention are illustrated in the following examples, which are intended to show the best or preferred embodiments.

In these examples the heat distortion temperature (HDT), glass transition temperature (Tg), and the other physical properties were measured in accordance with standard ASTM test procedures. Flame retardance was evaluated according to the Underwriters Laboratories' Bulletin No. 94 Burn Test.

EXAMPLE 1

Fifty gram portions of styrene, dibromostyrene, or a mixture of styrene and dibromostyrene, respectively, were placed in pressure bottles, which were then purged with nitrogen, sealed and heated for four days at 120° C. The product in each case was dissolved in toluene and the polymer recovered by precipitation in methanol. The polymer yield was greater than 45 grams, each case, indicating substantially complete conversion of both monomers to the polymer.

Fifty:fifty blends of each of the products described above with poly(2,6-dimethyl-1,4-phenylene ether) (PPO ® General Electric Company) were prepared by coprecipitation from toluene solution in methanol, and the blends were compression molded into films of 0.008 inch thickness. The glass transition temperature of each of the films was measured conventionally by use of a differential scanning calorimeter.

Copolymers containing 40% by weight, or less, of dibromostyrene were compatible with PPO, as shown by the presence of a single glass transition in the blend. Those copolymers containing 60% by weight, or more, of dibromostyrene were incompatible with PPO, as indicated by two distinct glass transitions in the admixture.

TABLE 1

| Dibromostyrene in Copolymer, wt. % | Tg of 50:50 Blend with PPO, °C. |
|---|---|
| 0 | 139 |
| 20 | 143 |
| 40 | 145 |
| 60 | 125 and 177 |
| 80 | 131 and 201 |
| 100 | 154 and 209 |

EXAMPLE 2

Twelve and one-half grams of each of the polymers and copolymers prepared in Example 1 were dissolved in warm toluene, together with an equal amount of PPO, and the mixture was precipitated by addition to a large volume of methanol. The resultant 50:50 blends of PPO and dibromostyrene copolymer (or dibromostyrene homopolymer, or styrene homopolymer, as shown) were compression molded into ⅛ inch thick test bars and the flame retardance was measured by the procedure of UL-94.

TABLE 2

| Dibromostyrene in Copolymer wt. % | 50:50 Blend with PPO | |
|---|---|---|
|  | HDT, °F. | Ave. Burn Time, sec. |
| 0 | 271 | 25 |
| 20 | 281 | 2 |
| 40 | 301 | 0 |
| 60 | 334 | 0 |
| 80 | 354 | 0 |
| 100 | 379 | 0 |

EXAMPLE 3

Five hundred grams of dibromostyrene and 500 grams of styrene were placed in a stainless steel reactor. To this were added 0.6 gram of azo-bis(isobutyronitrile) and 0.5 gram of dicumyl peroxide, and the reactor was then purged with nitrogen. The mixture was heated, with stirring, at 82° C. for five hours and then suspended in 2000 milliliters of water containing 4.5 grams of gelatin and 6 grams of poly(vinyl alcohol). The suspension was heated for one hour at 100° C., then for 17 hours at 135° C. The resultant polymer beads were filtered off, washed with water, and extruded into molding pellets. Analysis showed a bromine content of 30.5%.

A mixture of 40 parts by weight of styrene-dibromostyrene copolymer, 40 parts by weight of PPO, 2.4 parts by weight of triphenyl phosphate, 8 parts by weight of styrene-butadiene elastomeric block copolymer (Shell's Kraton 1101), 1.2 parts by weight of polyethylene, 0.8 part by weight of diphenyl decyl phosphite, 0.12 part by weight of zinc sulfide, 0.12 part by weight of zinc oxide and 2.4 parts by weight of titanium dioxide was extruded in a 28 mm twin screw extruder, then molded into standard test pieces in an injection molding machine. A mixture of the same composition, but with the styrene-dibromostyrene copolymer replaced with styrene homopolymer (Shell's 203 resin), was extruded and molded in the same way. The composition made with the styrene-dibromostyrene copolymer was inferior to the control made with polystyrene homopolymer (Shell 203) in ductility and impact strength, but much superior in heat distortion temperature and flame retardance, as can be seen from the results reported in the Table below.

TABLE 3

| Polystyrene | Tensile elongation, % | Tensile yield, psi | Izod impact strength, ft. lbs./in. | HDT, °F. | UL-94 | Ave. Burn Time, seconds |
| --- | --- | --- | --- | --- | --- | --- |
| Shell's 203 Polystyrene homopolymer | 32 | 11,900 | 2.3 | 255 | Failed (all samples dripped) | 90 |
| 50:50 styrene: dibromostyrene copolymer | 8 | 9,000 | 0.4 | 285 | V-O | 4.9 |

EXAMPLE 4

A mixture of 250 grams of dibromostyrene and 750 grams of styrene was polymerized as described in Example 3, suspended after 7 ½ hours, then heated for 15 hours at 120° C. The product was washed with water, dried and extruded into pellets. It contained 16.4% bromine.

A mixture of 40 parts of PPO, 60 parts of the copolymer, 10 parts of styrene-butadiene block copolymer (Kraton 1101), 1 part of diphenyl decyl phosphite, 1.5 parts of polyethylene, 8 parts of triphenyl phosphate, 0.15 part of zinc sulfide, 0.15 part of zinc oxide and 3 parts of titanium dioxide was extruded and molded as described in Example 3. A control blend was prepared in the same way with Shell 203 polystyrene homopolymer in place of the styrene-dibromostyrene copolymer. The properties are shown in Table 4.

As can be seen, the composition made with the dibromostyrene copolymer has good ductility and impact strength, and better flame retardance and heat distortion temperature than the control composition.

TABLE 4

| Polystyrene | Tensile elongation, % | Tensile yield, psi | Izod impact strength, ft. lbs./in. | UL-94 1/16 inch | Ave. Burn Time, seconds |
| --- | --- | --- | --- | --- | --- |
| Shell 203 Polystyrene homopolymer | 59 | 8,200 | 3.2 | Failed (dripped in 5 of 10 ignitions) | 18.2 |
| 75:25 Styrene: dibromostyrene copolymer | 53 | 8,600 | 2.7 | V-1 | 5.7 |

All of the above mentioned patents are incorporated herein by reference.

The invention may be varied or modified from the particular embodiments shown. For instance, instead of poly(2,6-dimethyl-1,4-phenylene ether) resin, a copolymer such as poly(2,6-dimethyl-co-2,3,6-trimethyl-1,4-phenylene ether) resin can be substituted. Instead of Kraton 1101 styrene-butadiene copolymer, other impact modifiers such as HIPS, hydrogenated block copolymers (e.g., Shell's Kraton ® G polymers), radial teleblock copolymers (Phillips' Chemical's Solprene ® materials), or Firestone's Stereon ® 840 may be used. Glass reinforced and clay filled embodiments are also possible. To enhance the flame retardancy effect of the styrene-dibromostyrene copolymer, it may be advantageous to add a small amount of antimony oxide or other antimony or molybdenum compound. Thus, changes can be made which are still within the scope of the invention as defined by the appended claims.

We claim:

1. A method for increasing the heat distortion temperature after molding of a flame retardant blend of a polyphenylene ether resin and a styrene polymer, comprising forming a compatible admixture of a polyphenylene ether resin and a flame retardant copolymer of styrene and dibromostyrene, said copolymer containing no more than 50 percent by weight of the dibromostyrene.

2. A method according to claim 1, in which the admixture of a minor amount of polyphenylene ether resin and a major amount of styrene-dibromostyrene copolymer is formed by coprecipitating the two from a common solvent.

3. A method according to claim 1, in which the copolymer is comprised of greater than 30 percent of 3,4-dibromostyrene.

4. A method according to claim 1, in which the polyphenylene ether resin is a homopolymer or copolymer of the formula

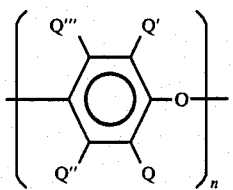

wherein Q, Q', Q" and Q''', are independently selected from the group consisting of hydrogen, halogen, hydrocarbon, halohydrocarbon, hydrocarbonoxy, and halohydrocarbonoxy; and n represents the total number of monomer units and is an integer of at least about 20.

5. A method according to claim 1, in which the polyphenylene ether resin is poly(2,6-dimethyl-1,4-phenylene ether) resin.

6. A method according to claim 1, which further comprises including at least one additional flame retardant agent in the blend.

7. A method according to claim 6, in which the additional flame retardant agent is an aromatic phosphate.

8. A method according to claim 7, in which the aromatic phosphate is triphenyl phosphate.

9. A method according to claim 1, which further comprises including an impact resistance improver in the blend.

10. A method according to claim 9, in which the impact improver is a styrene-butadiene elastomeric copolymer.

11. A method according to claim 1, which comprises the additional step of thermally forming the blend into a shaped article.

12. A method according to claim 1, in which the shaping is carried out by molding.

13. A flame retardant, light stable article produced by the method of claim 12, which is characterized by a higher heat distortion temperature in comparison with a corresponding article from a composition in which (b) is a homopolystyrene or a copolymer of styrene and monobromostyrene.

14. A flame retardant composition comprising a compatible admixture of
(a) a polyphenylene ether resin; and
(b) a flame retardant amount of a copolymer of styrene and dibromostyrene which contains no more than 50 percent by weight of the dibromostyrene.

15. A composition according to claim 14, in which the polyphenylene ether resin is a homopolymer or copolymer of the formula

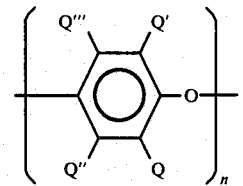

wherein Q, Q', Q" and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20.

16. A composition according to claim 15, in which the polyphenylene ether resin is poly(2,6-dimethyl-1,4-phenylene ether) resin.

17. A composition according to claim 14, in which the copolymer contains 3,4-dibromostyrene or 2,4-dibromostyrene units.

18. A composition according to claim 14, in which includes at least one additional flame retardant agent.

19. A composition according to claim 18, in which the flame retardant agent is an aromatic phosphate.

20. A composition according to claim 19, in which the aromatic phosphate is triphenyl phosphate.

21. A composition according to claim 14, which includes an impact resistance improving polymer.

22. A composition according to claim 21, in which the impact resistance improver is a styrene-butadiene elastomeric copolymer.

23. A composition according to claim 14, which contains a mineral filler.

24. A composition according to claim 23, in which the mineral filler is titanium dioxide.

25. A method according to claim 1, in which the admixture of a minor amount of polyphenylene ether resin and a major amount of styrene-dibromostyrene copolymer is formed by melt blending.

* * * * *